US011511681B2

(12) United States Patent
Bruegl et al.

(10) Patent No.: US 11,511,681 B2
(45) Date of Patent: Nov. 29, 2022

(54) DISPLAY DEVICE, AND VEHICLE

(71) Applicant: Bayerische Motoren Werke Aktiengesellschaft, Munich (DE)

(72) Inventors: Juergen Bruegl, Munich (DE); Harald Lathwesen, Mauern (DE); Alexander Walter, Munich (DE); Michael Wokrinek, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 17/263,225

(22) PCT Filed: Jul. 19, 2019

(86) PCT No.: PCT/EP2019/069470
§ 371 (c)(1),
(2) Date: Jan. 26, 2021

(87) PCT Pub. No.: WO2020/020763
PCT Pub. Date: Jan. 30, 2020

(65) Prior Publication Data
US 2021/0162931 A1 Jun. 3, 2021

(30) Foreign Application Priority Data
Jul. 27, 2018 (DE) ...................... 10 2018 212 604.6

(51) Int. Cl.
*B60R 11/00* (2006.01)
*B60R 11/02* (2006.01)
(Continued)

(52) U.S. Cl.
CPC .......... *B60R 11/0235* (2013.01); *B60K 35/00* (2013.01); *F16M 11/2028* (2013.01);
(Continued)

(58) Field of Classification Search
CPC .......... B60K 2370/67; B60K 2370/771; B60K 2370/816; B60K 35/00; B60R 11/0235;
(Continued)

(56) References Cited

U.S. PATENT DOCUMENTS 6,256,078 B1 * 7/2001 Ogata ................ B64D 11/0015
349/58
2005/0013099 A1 * 1/2005 Chou .................... G06F 1/1601
361/679.06
(Continued)

FOREIGN PATENT DOCUMENTS

CN 103538532 A * 1/2014
DE 102014019443 A1 * 6/2016
(Continued)

OTHER PUBLICATIONS

International Search Report (PCT/ISA/210) issued in PCT Application No. PCT/EP2019/069470 dated Sep. 17, 2019 with English translation (four (4) pages).
(Continued)

*Primary Examiner* — Christopher S Kelley
*Assistant Examiner* — Kathleen M Walsh
(74) *Attorney, Agent, or Firm* — Crowell & Moring LLP

(57) ABSTRACT

A display device for the interior of a vehicle includes a display unit designed to optically display information, and a movement mechanism designed to transfer the display unit, controllably, between a non-usage position parallel to a roof liner of the vehicle and a usage position, swivelled away from the roof liner of the vehicle, and to retain the display unit, controllably, in the non-usage position and/or in the usage position. The movement mechanism is attached to the display unit: by first guide elements in order to define a swivel axis for swivelling the display unit at least between the non-usage position and the usage position; by second
(Continued)

guide elements, each of which is or can be coupled to the display unit in a mechanical operative connection via a coupling lever of the display device; and by guide rails for attaching to the roof liner. The rails have a guide track for receiving the guide elements and for moving same therein along the guide track.

12 Claims, 18 Drawing Sheets

(51) Int. Cl.
*B60K 35/00* (2006.01)
*F16M 11/20* (2006.01)

(52) U.S. Cl.
CPC .... *B60K 2370/67* (2019.05); *B60K 2370/771* (2019.05); *B60K 2370/816* (2019.05); *B60R 2011/0028* (2013.01); *B60R 2011/0085* (2013.01); *B60R 2011/0092* (2013.01); *F16M 2200/068* (2013.01)

(58) Field of Classification Search
CPC ..... B60R 2011/0028; B60R 2011/0085; B60R 2011/0092; F16M 11/2028; F16M 2200/068

USPC ........................................................ 348/837
See application file for complete search history.

(56) References Cited

U.S. PATENT DOCUMENTS

| | | |
|---|---|---|
| 2009/0038422 A1 | 2/2009 | Choi |
| 2015/0138449 A1* | 5/2015 | Rawlinson ....... H04N 21/41422 348/837 |
| 2018/0027689 A1* | 1/2018 | Muldowney ........... H05K 7/183 361/807 |

FOREIGN PATENT DOCUMENTS

| | | |
|---|---|---|
| ER | 2 873 563 A1 | 5/2015 |
| JP | 2004149057 A * | 5/2004 |

OTHER PUBLICATIONS

German-language Written Opinion (PCT/ISA/237) issued in PCT Application No. PCT/EP2019/069470 dated Sep. 17, 2019 (five (5) pages).

German-language Search Report of German Application No. 10 2018 212 604.6 dated Apr. 6, 2022 with English translation (12 pages).

* cited by examiner

DISPLAY DEVICE, AND VEHICLE

BACKGROUND AND SUMMARY OF THE INVENTION

The present invention relates to a display device for the interior of a vehicle, and to a vehicle as such.

It is known practice, for the purpose of visually displaying information associated with a seat in a vehicle, and in particular in a general motor vehicle or passenger car, to mount a display device on the inside of the vehicle roof, for example on the roof liner. It is also known practice for such display devices, in the rear region of a vehicle, to be integrated into the rear side of a driver's seat or passenger seat, for example in the region of the head restraint.

On the one hand, such known displays are of comparatively small spatial dimensions, this also being due to the fact that masses associated with larger displays cannot be handled in a reliable manner, in particular when mounted inside the roof.

The invention is based on the object of creating a display device for the interior of a vehicle, and a vehicle as such, in which even large and heavy display units can be handled reliably and easily by simple means.

The object on which the invention is based is achieved, in the case of a display device according to the invention and in the case of a vehicle according to the invention, by the features of the independent claims. Advantageous developments are provided in each case by the dependent claims.

Created according to a first aspect of the present invention is a display device for the interior of a vehicle, and in particular of a motor vehicle or passenger car, that is realized comprising a display unit designed to visually display information, and comprising a movement mechanism designed to transfer the display unit, in particular controllably, between a position of non-use parallel to a roof liner of the vehicle, and a position of use, in particular swiveled away from the roof liner of the vehicle, and to hold it, in particular controllably, in the position of non-use and/or in the position of use.

The movement mechanism in this case:
(i) is attached to the display unit by first guide elements for the purpose of defining a pivot for swiveling the display unit at least between the position of non-use and the position of use,
(ii) realized with second guide elements, each of which is or can be coupled to the display unit in a mechanical operative connection via a coupling lever of the display device, and
(iii) realized with guide rails, for attaching to the roof liner, which have a guideway for receiving the guide elements and for moving them therein along the guideway.

These measures, and in particular the action of the first guide elements and the second guide elements in combination with a coupling lever in the guide rails, make it possible in the interior of a vehicle to easily and reliably handle display devices having a larger, and therefore heavier, display unit, that hitherto have been difficult to handle because of their greater mass, it being possible, for example, to use the inertia of the display device, in conjunction with the movement capabilities resulting from the guide elements in the guide rails acting in combination with the coupling lever, for passive, inertia-driven deflection of the display unit out of the passenger compartment.

In the case of an advantageous embodiment of the display unit according to the invention, the coupling levers are realized separately or combined as a pair, identical or substantially identical to each other, of equal length, linear or substantially linear, aligned parallel to each other, aligned flush with each other and/or each realized with a first end and a second end. These measures, individually or in combination, result in a high degree of flexibility due to adaptability to the respective geometric conditions in the vehicle interior, also commensurate with a respective embodiment of the particular display unit in respect of geometry and weight.

It may be provided in this case, according to another advantageous development of the display device according to the invention, that a respective first end of a coupling lever is attached in a rotatably mounted manner to the display unit, and/or that a respective second end of a coupling lever is attached in a rotatably mounted manner to an associated second guide element. By means of these measures, a swiveling mechanism for swiveling the display unit between the position of non-use and the position of use—in particular continuously—can be realized in a reliable and stable manner by the first guide elements and the second guide elements acting in combination with the coupling lever, by means of the movement capability and the engagement in the guide rails.

It is additionally advantageous in this case if, according to another embodiment of the display device according to the invention, a position of a mounting point of a first end of a coupling lever on the display unit is in each case spatially spaced apart from a position of a mounting point of an associated first guide element and/or is arranged on or in the region of a longitudinal edge of the display unit. With these measures it is possible to achieve a reliable balancing of even relatively large display units.

With regard to the design of the first and second guide elements, there are numerous possibilities for adaptation to the conditions of the vehicle interior and/or of the display unit.

It is thus contemplated that, alternatively or in any combination, the first guide elements and/or the second guide elements are:
- identical or substantially identical amongst each other or as a whole,
- realized as sliders, and/or
- configured for sliding movement in a respective guide rail.

It is also alternatively or additionally contemplated that the first guide elements are attached to, or in the region of, a first transverse edge and/or a longitudinal edge of the display unit.

In this case, when the display device has been mounted in the associated vehicle, the first transverse edge, in particular together with the pivot, may be aligned parallel to a direction of transverse extent of the vehicle. This makes it possible to conveniently create in the vehicle interior, for example, a common alignment of the display unit of the display device that is suitable for the entire rear region.

In principle, the display unit on which a display unit is based may be of any geometrical configuration.

However, particularly simple ratios are obtained if, according to another advantageous embodiment of the display device according to the invention, the display unit is realized with a substantially rectangular shape, with transverse edges aligned parallel to a direction of transverse extent of the vehicle when the display device has been mounted on the associated vehicle, and/or with longitudinal edges aligned parallel to a direction of longitudinal extent of the associated vehicle when the display device has been mounted on the associated vehicle. This also facilitates an orientation of the display unit of the display device that is favorable for the rear region.

There are also numerous variation possibilities for the guide rails used.

It is thus contemplated for the guide rails on which a display device is based are:
  realized as a pair,
  identical or substantially identically to each other,
  linear or substantially linear,
  curved or portionally curved,
  aligned parallel to each other,
  aligned flush with each other, in particular in respect of their respective first and second ends,
  attached to, or in the region of, a roof liner when the display device has been mounted on the associated vehicle, and/or
  aligned parallel to a direction of longitudinal extent of the vehicle when the display device has been mounted on the associated vehicle.

Aspects of greater ease of operation and movement are particularly important in the use of display units that project into the passenger compartment of the interior of the vehicle when a position of use is assumed, in particular when large or bulky display units are used.

In order to achieve this, according to another aspect of the present invention there may be incorporated into the display device according to the invention certain mechanisms that provide a greater degree of passive movement of a display unit.

It is thus contemplated, according to an advantageous development of the display device according to the invention, to realize a specified buckling point, having a predefined breakaway force as a specified buckling force, on or in a respective coupling lever in such a manner that, upon the specified buckling force being exceeded, the coupling lever buckles inward at the specified buckling point and thereby changes from a non-buckled normal shape into a buckled safety shape. The buckled safety shape of the coupling lever is associated with a corresponding swiveling of the display unit within the interior of the vehicle, for example from a position of use of the display unit in the direction of the position of non-use and, in particular, parallel to the roof liner, resulting in clearing of the interior of the vehicle. The accordingly necessary breakaway force as a specified buckling force is generated, for example, when a deceleration exceeds a predefined minimum magnitude due to the inertia of the mass of the display unit upon motional deceleration.

It is thereby possible, depending on the orientation of the swivel axis and/or the first guide elements defining it in relation to the coupling lever and its mounting points on the display unit and the position of the second guide elements, to make use of an inertia-driven deflection of the display unit upon the occurrence of deceleration forces that exceed a predefined minimum magnitude.

Alternatively or additionally, it is contemplated as a measure to realize a slip clutch and/or a brake, in particular in each case having a return stop, on or in a first guide element or between a first guide element and an associated guide rail, and having a predetermined holding force as a specified holding force, in such a manner that, upon the specified holding force being exceeded, a respective first guide element moves—in response to the acting force—in a respectively associated guide rail. This means that, in a case with a deceleration exceeding a predefined minimum magnitude, due to the inertia, the maximum holding force or braking force of the clutch or brake is exceeded, such that first guide elements are unlocked and move along the guideways of the guide rails and thus, by means of the mechanical coupling to the display unit, cause the latter to deflect out of the passenger compartment, i.e. out of the interior of the vehicle, from a position of use into a position of non-use, and thereby to clear the interior of the vehicle.

The specified buckling force and/or the specified holding force in this case may have a value that is in a range corresponding to an acceleration in the range of 5 g or more.

In principle, it is contemplated to realize the guide elements, the coupling lever and the guide rails in such a manner that, by means of corresponding catches, folding out and in and/or positioning of the display unit of the display device according to the invention can be effected manually.

Realized in the case of a particularly advantageous embodiment of the display device according to the invention, however, is a drive unit that is designed to drive the first guide elements and/or the second guide elements, and for moving the first guide elements and the second guide elements separately and/or jointly and in particular equally in a respective guide rail.

Additionally or alternatively, it is contemplated for the drive unit to be realized with one or more controllable drives, and with drive means that are or can be mechanically coupled to them and that are assigned to respective guide elements, in particular in the form of brush cables or helical cables that are designed for engagement, in particular meshing engagement, by first and/or second guide elements for the purpose of moving them.

It is then thus possible, in particular, to use a drive such as that also used for sliding roofs, to drive the corresponding roof elements in a corresponding frame.

Different modes of movement of the display unit of the display device can be realized by moving the guide elements independently or jointly.

Moving the guide elements jointly and equally in the guide rail along the guideway, i.e. with equal speed in the same direction, causes the display unit to be displaced along the guideway of the guide rails and, for example, parallel to the direction of longitudinal extent of the vehicle in the interior of the vehicle, namely without changing the inclination of the display unit.

By contrast, a relative movement between the first and second guide elements, with the guide elements and the coupling levers being arranged accordingly with respect to each other and in relation to the display unit and to the guide rails, provides a swiveling movement, namely with translation of the pivot that is defined, for example, by the first guide elements, when the first guide elements are moved, and with a fixed pivot when the first guide elements are not moved and only the second guide elements move.

By appropriate coordination of the movement of the first and second guide elements, it is therefore possible to move the display unit, swivel the display unit or combine these forms of movement, in a manner controlled by open-loop or closed-loop control, in the interior of an associated vehicle.

According to another aspect of the present invention, a vehicle is also correspondingly created. It comprises a vehicle body, an interior that is formed by the vehicle body and has a roof liner, and a display device attached on or in the roof liner and designed according to the invention.

In the case of a particularly preferred embodiment of the vehicle according to the invention, two guide rails of the display device are attached on or in the roof liner in such a manner that they extend with equal length flush and parallel to each other in a direction of longitudinal extent of the vehicle, in particular on or—with respect to a direction of transverse extent of the vehicle—in outer regions of the roof liner.

Furthermore, additionally or alternatively, two first guide elements of the display device are received in or into the guide rails in such a manner that a corresponding first transverse edge of the display unit of the display device, to the region of which the first guide elements are attached, is arranged parallel to the direction of transverse extent of the vehicle and, with respect to the direction of longitudinal extent of the vehicle, in the direction of a side that faces toward the rear of the vehicle.

It is also additionally or alternatively provided that two second guide elements of the display device are received in the guide rails in such a manner that a second transverse edge of the display unit of the display device that is opposite the first transverse edge is arranged in the direction of a side that faces away from the rear of the vehicle.

Further details, features and advantages of the invention are given by the following description and the figures.

Figure 1:
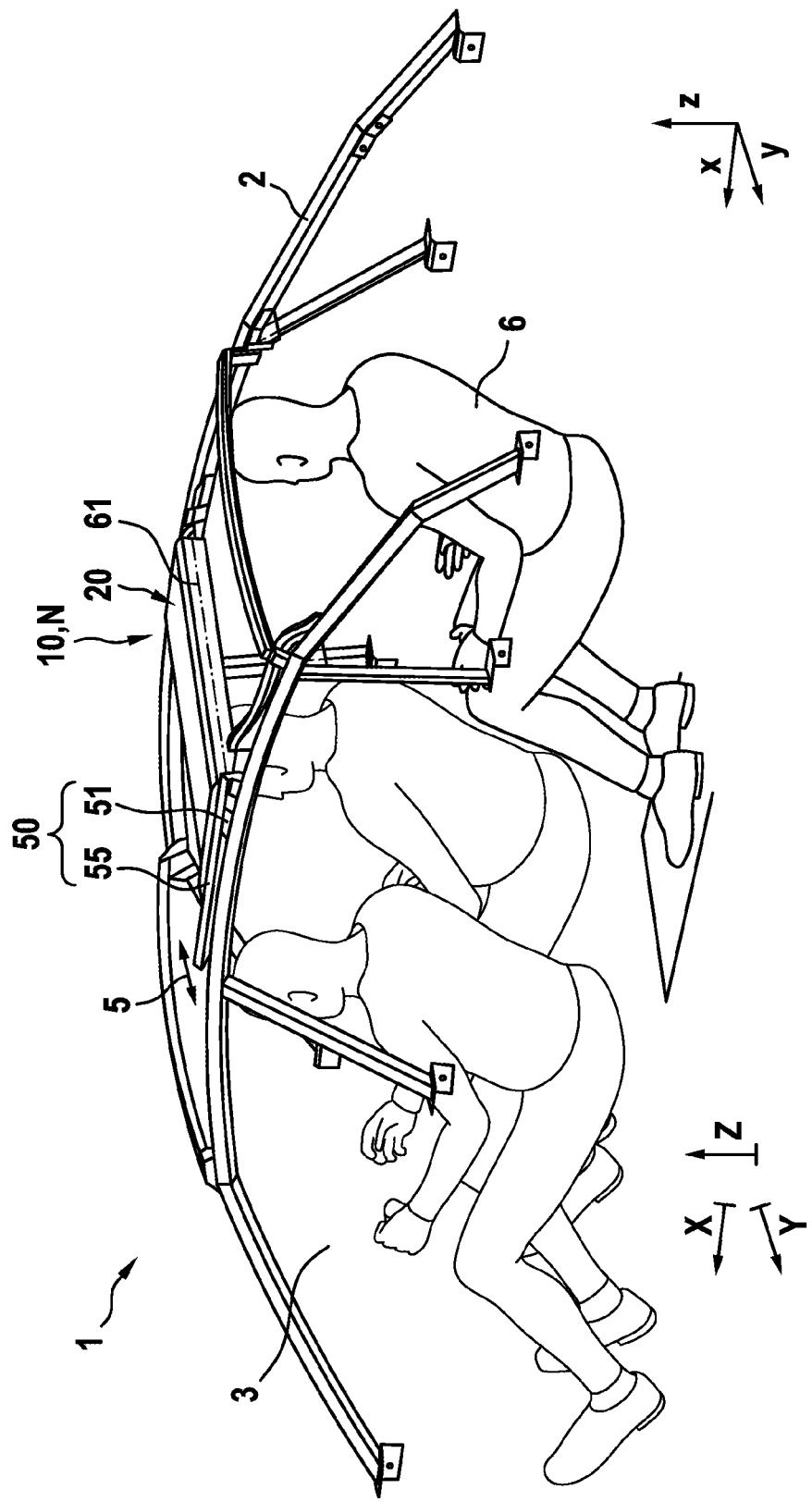
FIGS. 1 to 4 show schematic, perspective side views of an embodiment of the vehicle according to the invention that is equipped with an embodiment of the display device according to the invention, the display unit being arranged in differing positions in the interior of the vehicle.

Exemplary embodiments and the technical background of the invention are described in detail in the following with reference to FIGS. 1 to 18. Elements and components that are identical and equivalent, and elements and components that are identical or equivalent in their effect, are denoted by the same references. The detailed description of the denoted elements and components is not repeated in each instance of their occurrence.

The features and other characteristics represented may be isolated from each other in any manner and combined with each other in any manner without departure from the core of the invention.

DETAILED DESCRIPTION OF THE DRAWINGS

FIGS. 1 to 4 show a schematic, perspective side views of an embodiment of the vehicle 1 according to the invention that is equipped with an embodiment of the display device 10 according to the invention, the display unit 20 of the display device 10 being arranged in differing positions N, G in the interior 3 of the vehicle 1.

In all figures, and also in FIGS. 1 to 4, the vehicle 1 is represented schematically by components of a vehicle body 2 that surround an interior 3 of the vehicle 1 and define a roof liner 5.

The respective vehicle 1 extends in a direction of longitudinal extent X parallel to the x-direction, in a direction of transverse extent Y parallel to the y-direction, and in a height direction Z parallel to the z-direction, which are defined by the respectively indicated trihedral.

Figure 2:
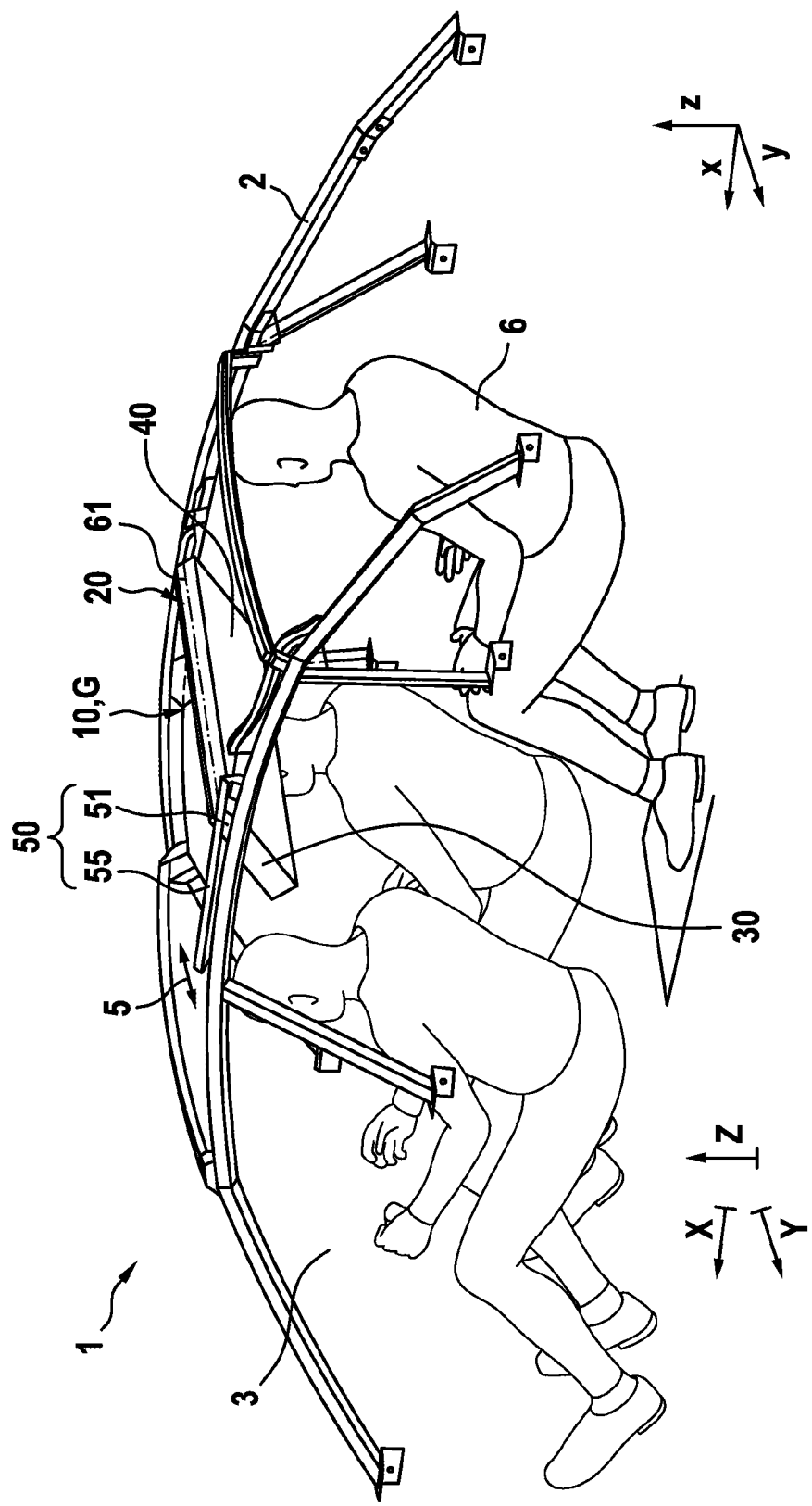
Figure 3:
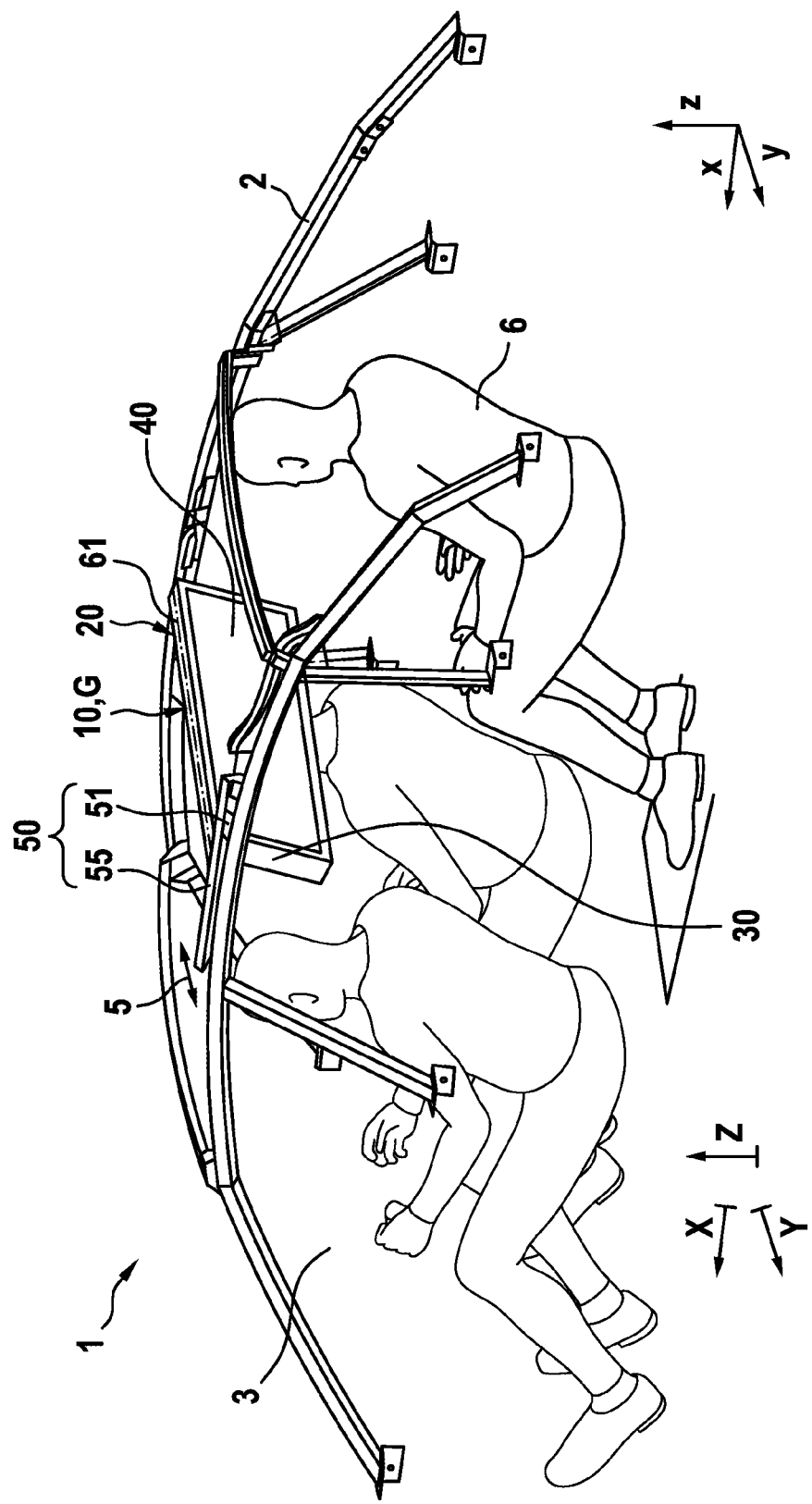
Figure 4:
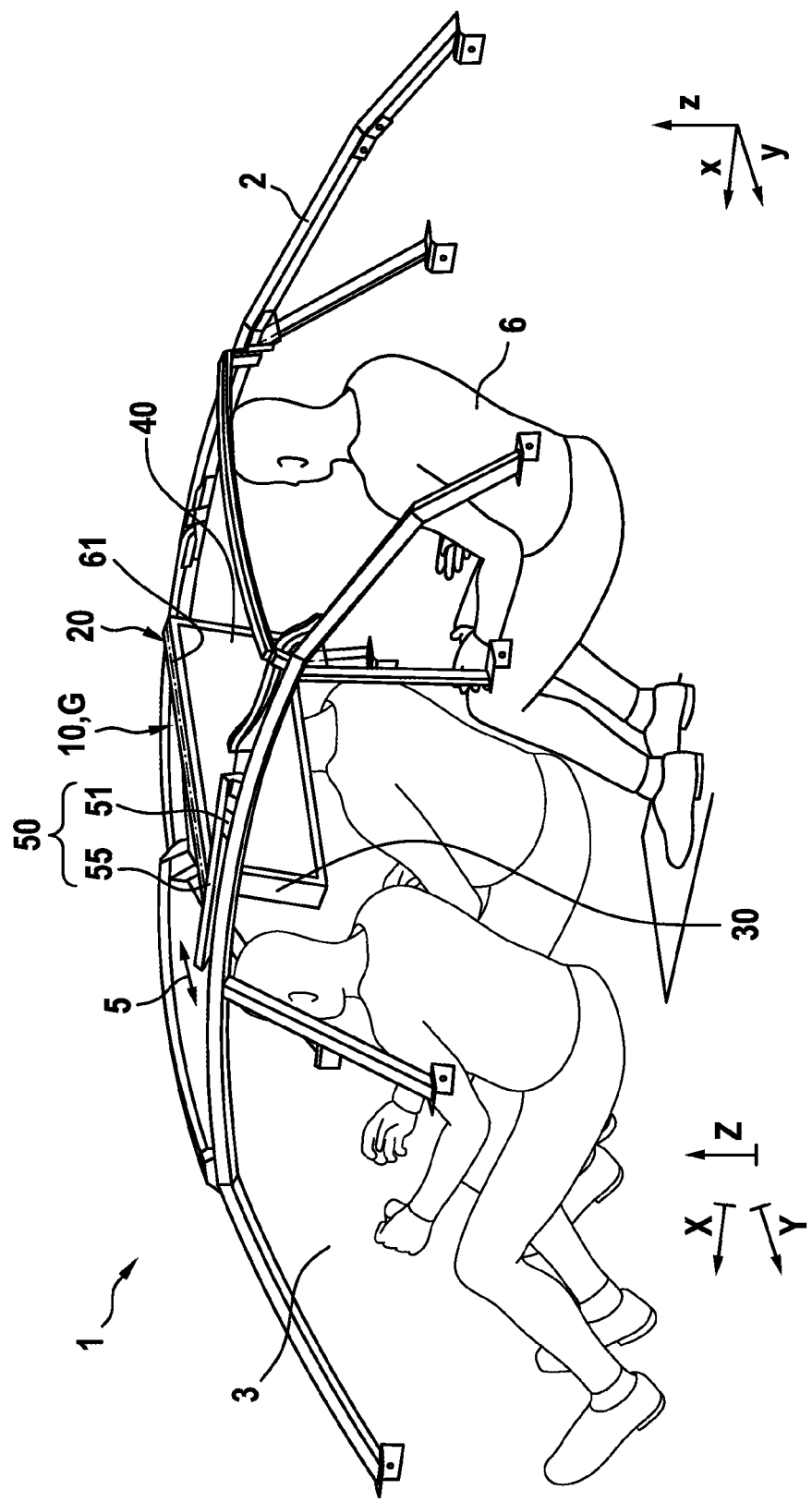

In the representations of FIGS. 1 to 4, a display device 10 that is represented in each case is formed by the actual display unit 20, for example having a carrier 30 that caries a display element 40, for example a monitor or a screen, as shown by FIGS. 2 to 4. The display unit 20 in this case has a substantially rectangular shape, having longer transverse edges 21 parallel to the direction of transverse extent Y of the vehicle 1, and having shorter longitudinal edges 22 parallel to the direction of longitudinal extent X of the vehicle 1.

Another constituent part of the display device is a movement mechanism 50. In the case of the embodiment represented in FIGS. 1 to 4, it is formed by two guide rails 55, two first guide elements 51, two second guide elements 52 and two coupling levers 53.

In the case of this embodiment, the guide rails 55 are of identical design, having a linear shape of equal length, being arranged parallel to each other and flush with the roof liner 5, and each forming a guideway 56. In principle, curved guide rails 55 are also contemplated. In the case of the embodiment of FIGS. 1 to 4, the guide rails 55 extend in the direction of longitudinal extent X of the vehicle 1. They are located, at a distance from each other in the direction of transverse extent Y, at the sides of the roof liner 5, i.e. in particular in the transition from the roof to the side of the vehicle.

The first and second guide elements 51 and 52 are realized, respectively, as first and second sliders, and are designed to be received and moved in a respective guide rail 55, or to move therein along the respective guideway 56.

In the region of a first transverse edge 21 of the display unit 20, the first guide elements 51 are attached in a rotatably mounted manner to the display unit 20, in such a manner that a swivel axle or pivot 61 of the display unit 20 is thereby defined. In particular, they are mounted on the transverse edge 21 of the display unit 20 located on a side that is assigned to the rear of a vehicle 1 and that, when the display unit 20 is mounted on vehicle 1, faces toward the rear side of the vehicle 1. The first guide elements 51 are preferably mounted in the vicinity of the opposing longitudinal edges 22 of the display unit 20, i.e. in particular virtually in the region of intersection of the longitudinal edges 22 and the transverse edges 21.

A first end 53-1 of a coupling lever 53 is in each case attached in a rotatably mounted manner to the display unit 20, in particular in the region of a longitudinal edge 22, at a distance from the respective mounting point of the first guide elements 51 on the display unit 20, and thus at a distance from the pivot 61. This means, in particular, that on each longitudinal edge 22 a coupling lever 53 is rotatably attached, by its first end, to the display unit 20 in the region of the longitudinal edge 22, the distances of the mounting points from the pivot 61 being, in particular, the same.

The second end 53-2 of a respective coupling lever 53 is attached in a rotatably mounted manner to a second guide element 52.

With the thus selected arrangement composed of first guide elements 51, second guide elements 52, coupling levers 53 and guide rails 55 having guideways 56, moving of the guide elements 51, 52 in the guide rails 55 makes it possible to change between a position of non-use N and one or more positions of use G of the display unit 20, with differing angles of inclination relative to the roof liner 5, and/or differing lateral positions along the guide rails 55, and thus, when mounted in a vehicle 1, along the direction of longitudinal extent X of the vehicle 1, being able to be assumed.

In FIG. 1, the display unit 20 is in the position of non-use, namely in a state in which the display unit is aligned substantially parallel to the roof liner 5.

In the transition to the intermediate state shown in FIG. 2, the display unit 20 is being swiveled, as a result of corresponding moving of the first and second guide elements 51, 52 in the guide rails 55, away from the roof liner 5 and into the passenger compartment 3 in order to assume a first position of use G.

In the transition to the intermediate state represented in FIG. 3, the display unit 20 is being swiveled by a greater angle away from the roof liner 5 and being brought into a more perpendicularly aligned, further position of use G.

In the transition to the intermediate state represented in FIG. 4, only displacement is then being effected, without alteration of the angle of inclination, as a result of simultaneous moving of the first and second guide elements 51 and 52, respectively, and in particular as a result of movement at an equal speed and by an equal distance, such that the viewing distance of a vehicle occupant 6 sitting behind can be adjusted, and in particular can be increased. In this case, in the intermediate shown in FIG. 4, the display unit has been moved into the front region of the vehicle 1.

The structure of the display device 10, with display unit 20 and movement mechanism 50, described above is also further illustrated on the basis of the other FIGS. 5 to 18.

Figure 5:
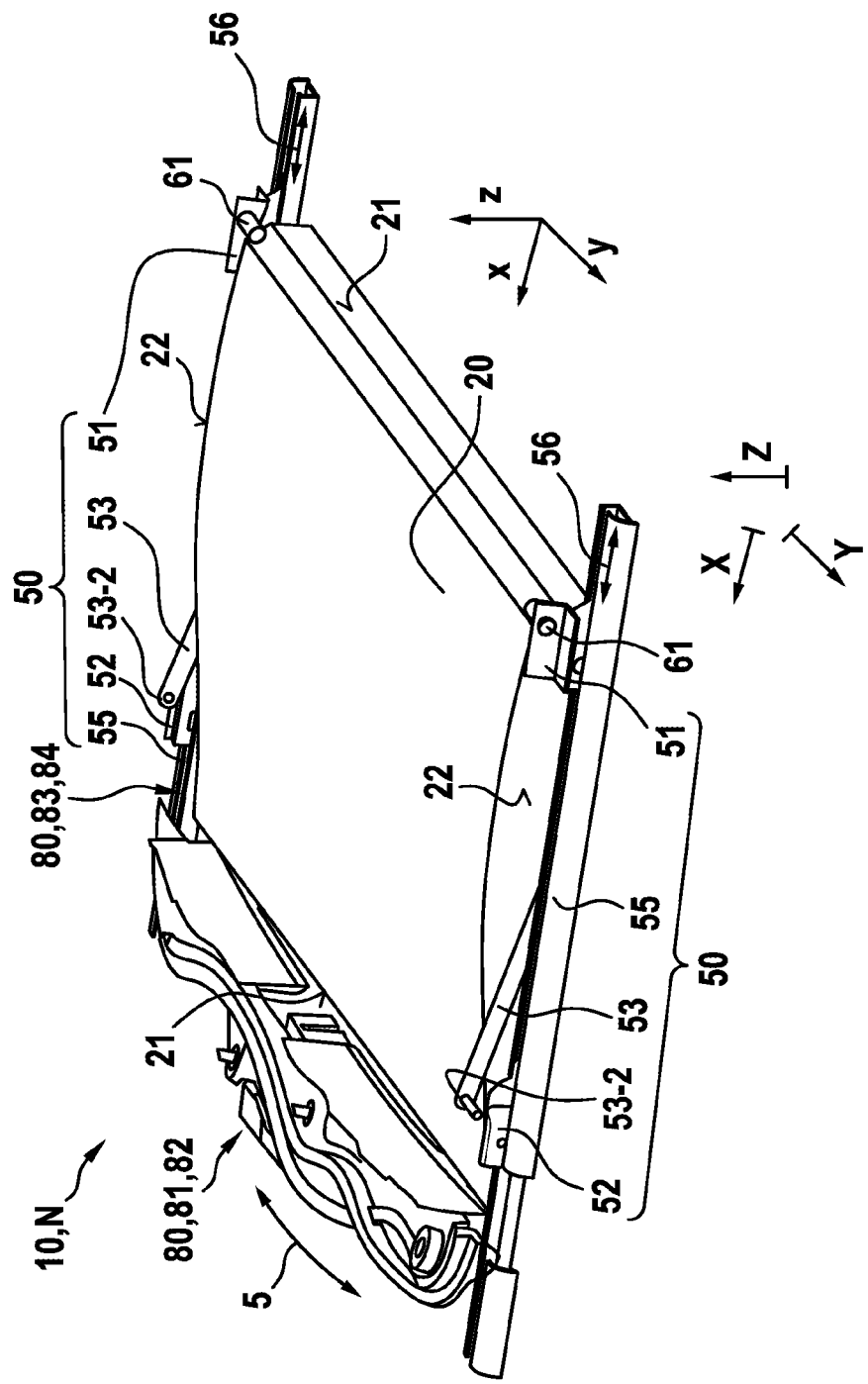
FIGS. 5 to 7 show in isolation schematic, perspective side views of another embodiment of the display device according to the invention, in differing positions.
Figure 6:
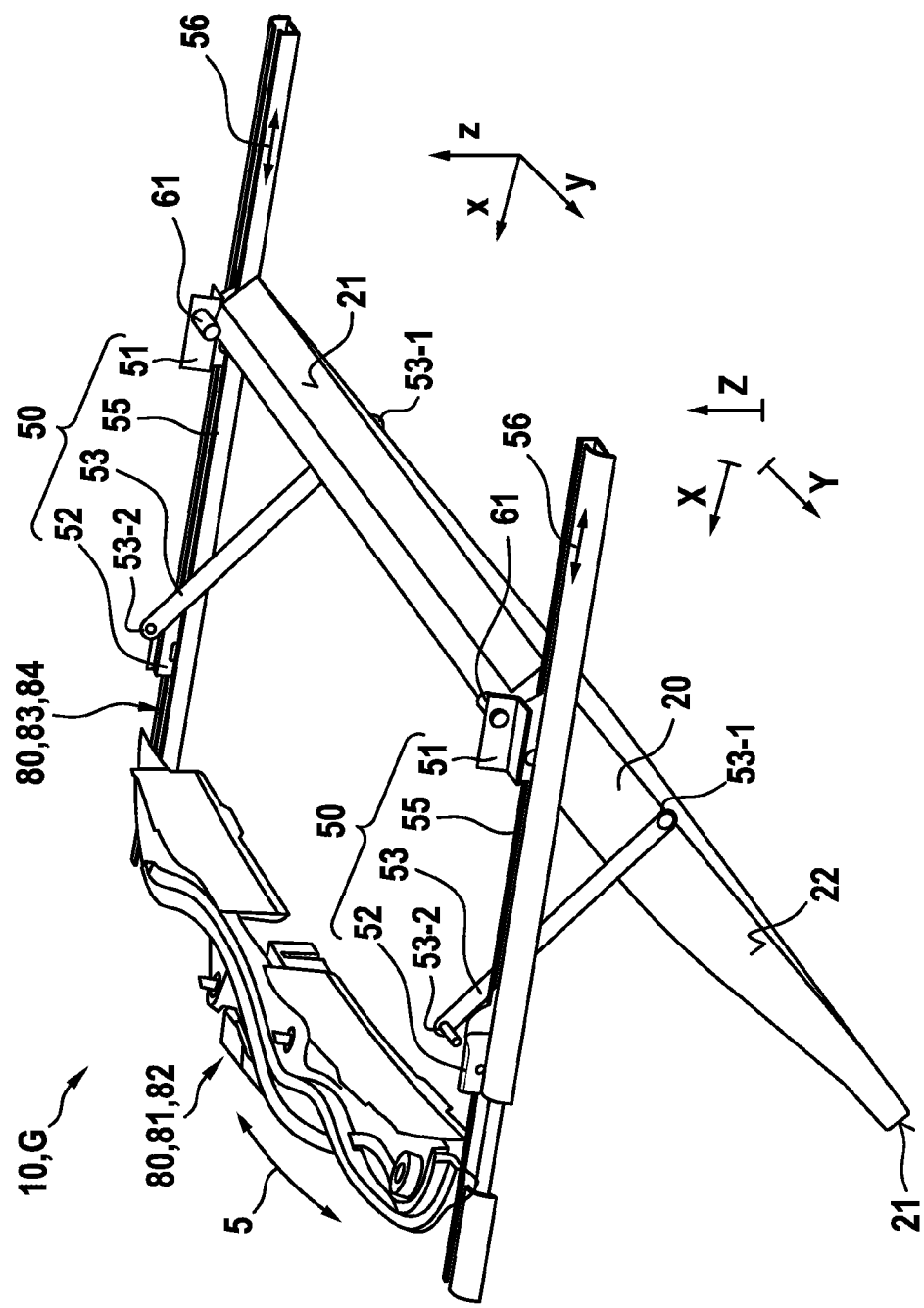
Figure 7:
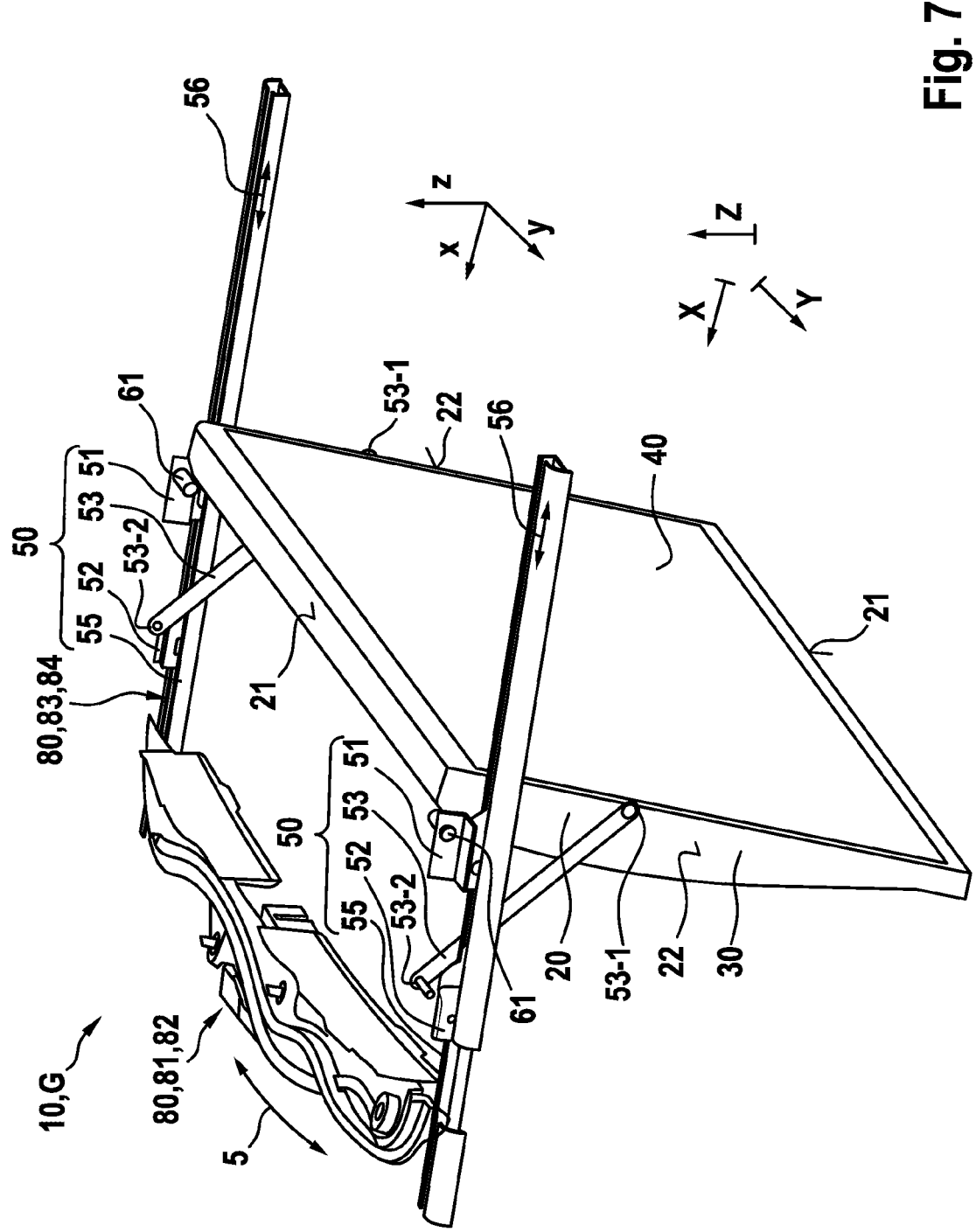
Figure 8:
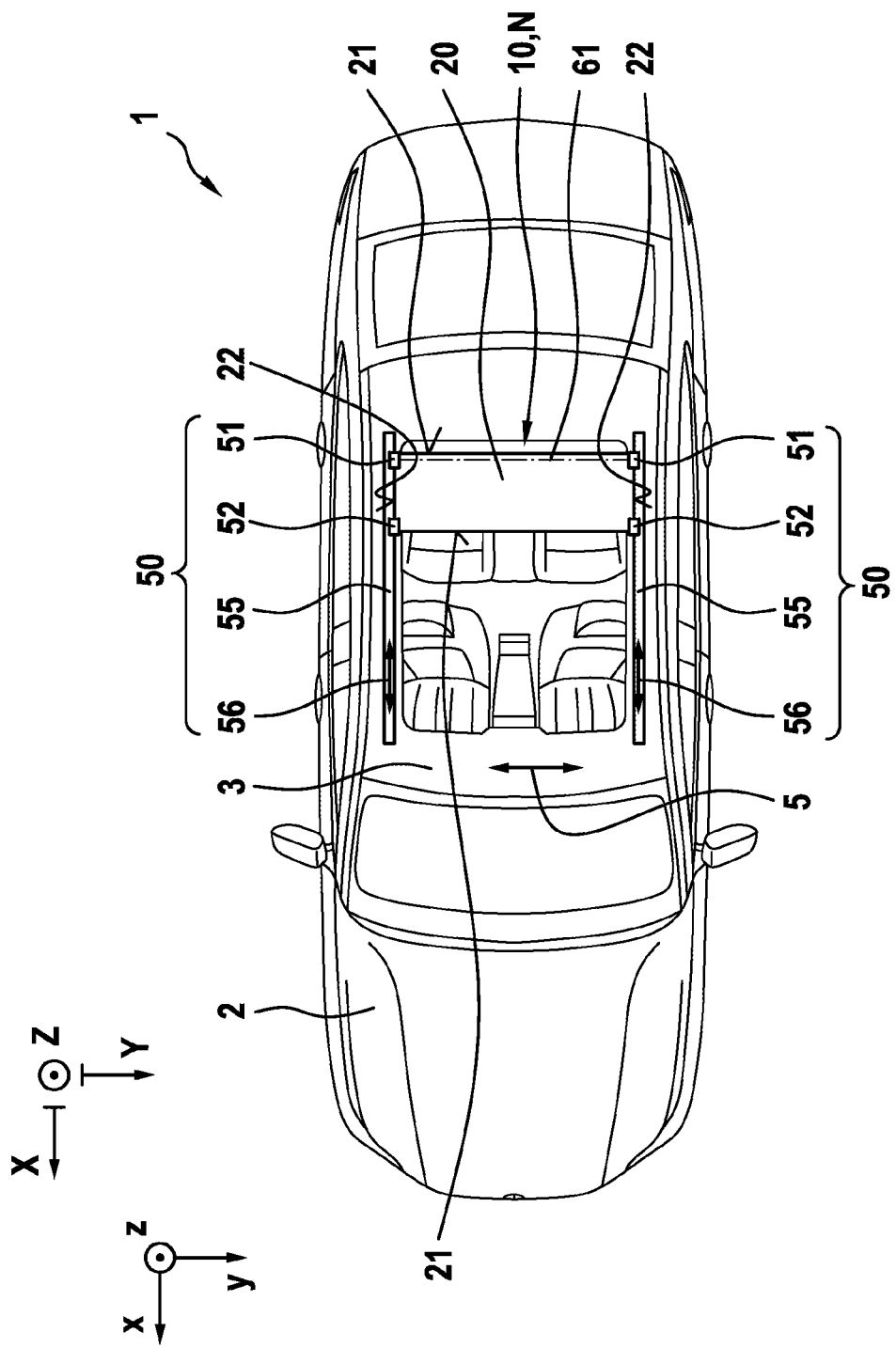
FIGS. 8 to 11 show schematic, perspective top views of a further embodiment of the vehicle according to the invention equipped with an embodiment of the display device according to the invention, the display unit being arranged in differing positions in the interior of the vehicle.
Figure 9:
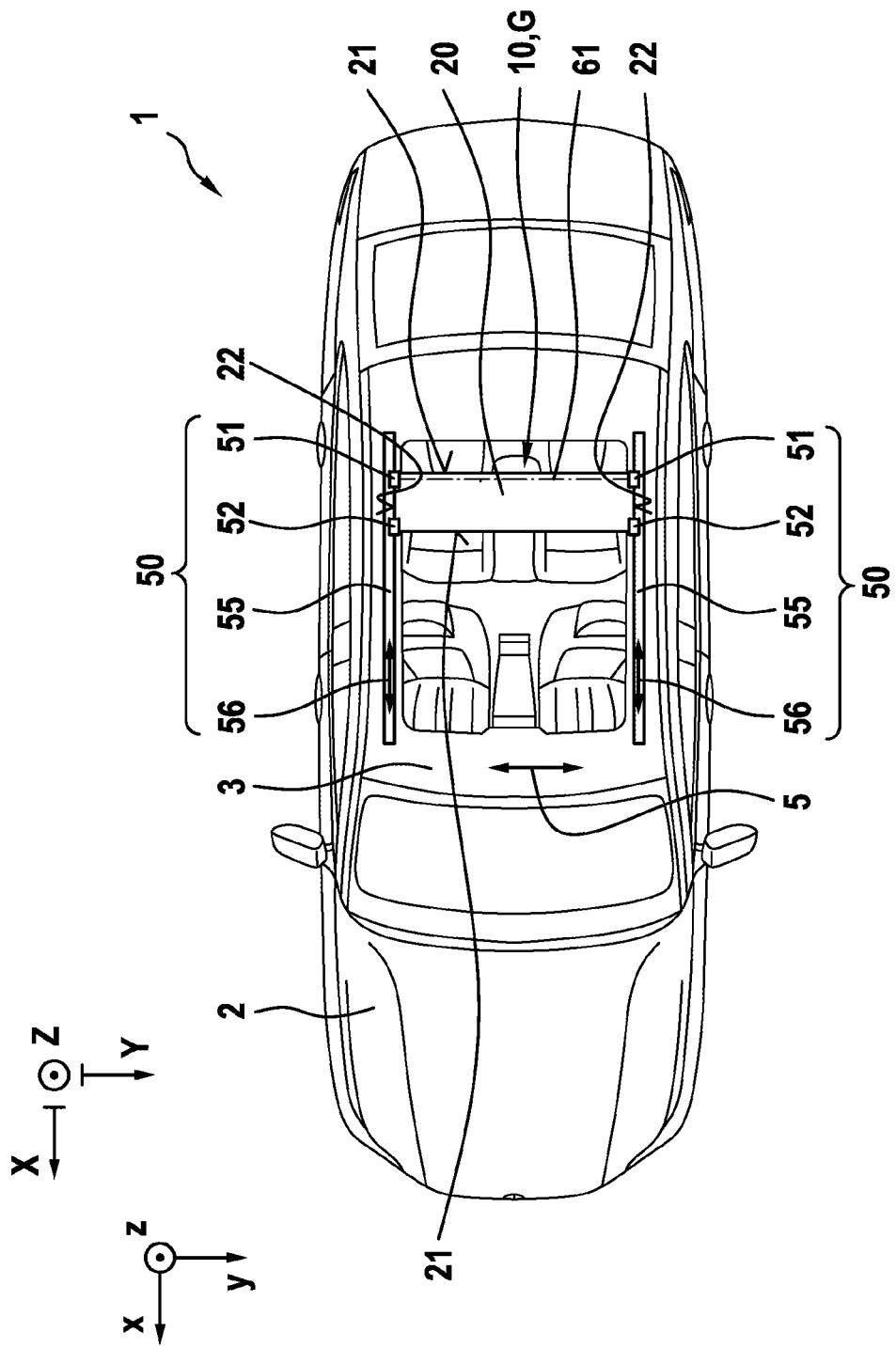
Figure 10:
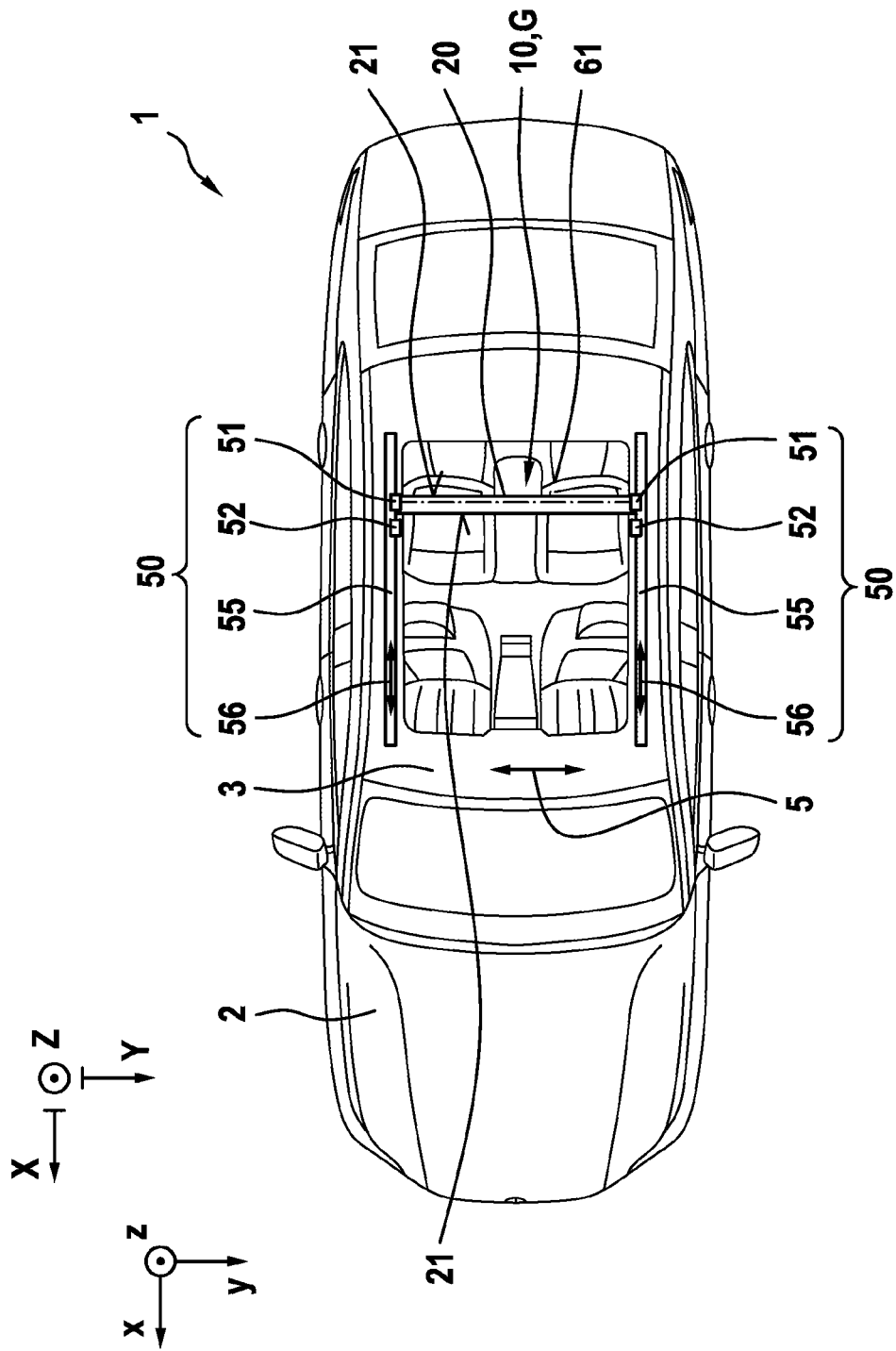
Figure 11:
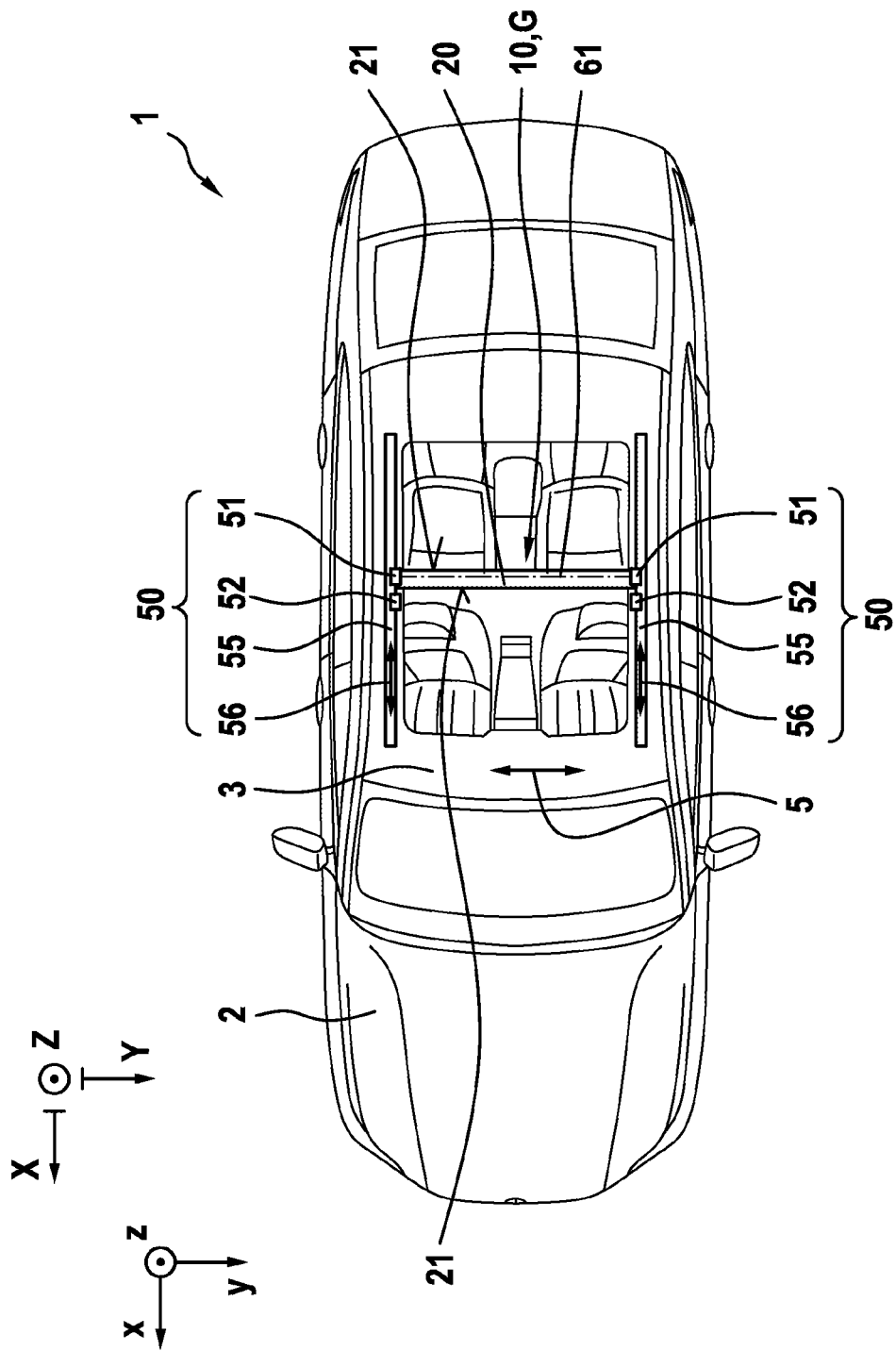

FIGS. 5 to 7 show in schematic, perspective side views another embodiment of the display device 10, in differing positions N, G.

The situation is similar to that represented in FIGS. 1 to 4, but here the focus is on the individual elements of the display device 10, and on the position of non-use N according to FIG. 5 and on the two positions of use according to FIGS. 6 and 7.

Shown again is the structure of the display unit 20, with the transverse edges 21 and the longitudinal edges 22, the carrier 30 and the actual display element 40. The first ends 53-1 of each coupling lever 53 are rotatably attached to the longitudinal edges 22, correspondingly at the same position. The second ends 53-2 of the coupling levers are rotatably fastened to second guide elements 52, which can run in the rail 55. The first guide elements 51 are rotatably attached at the intersection region between the transverse edge 21 assigned the rear seat and the longitudinal edges 22, in order thus to define a pivot or swivel axle 61 of the display unit 20.

Indicated schematically is a drive unit 80, by which the first and second guide elements 51 and 52, for example as a first and second slider, can be moved in the rails 55 along the guideways 56, in order to effect swiveling and/or displacement of the display unit 20 controlled by open-loop and/or closed-loop control.

The drive unit 80 may consist, for example, of a first drive 81, for instance a first motor, for the first guide elements 51, the coupling to the motor being effected via a first drive means 83, for example in the form of a brush cable or helical cable. Correspondingly, the drive unit 80 according to the invention may have a second drive 82, for example a second motor, for the second guide elements 52, the coupling to the motor correspondingly being effected via a second drive means 84, for example likewise in the form of a brush cable or helical cable. In this way, the first and second guide elements 51 and 52, respectively, can be moved autonomously, i.e. independently of each other, but also jointly, so that distances and inclinations of the display unit 20 within the interior 3 of the vehicle 1 are freely selectable.

FIGS. 8 to 11 show schematic, perspective top views of a further embodiment of the vehicle 1 according to the invention equipped with an embodiment of the display device 10 according to the invention, the display unit 29 being arranged in differing positions N and G in the interior 3 of the vehicle 1.

In the event of an accident, and in particular in the event of a frontal collision or rear-end collision, it is important that the display device 10 according to the invention is designed in such a way that a display unit 20 swiveled out in a position of use G is immediately swiveled back into the position of non-use N so that, upon the occurrence of decelerations that exceed a predefined minimum magnitude, the display unit 20 easily clears the interior 3 of vehicle 1.

For this purpose, according to another aspect of the present invention, there are various safety devices 70 realized on the display device 10.

Figure 12:
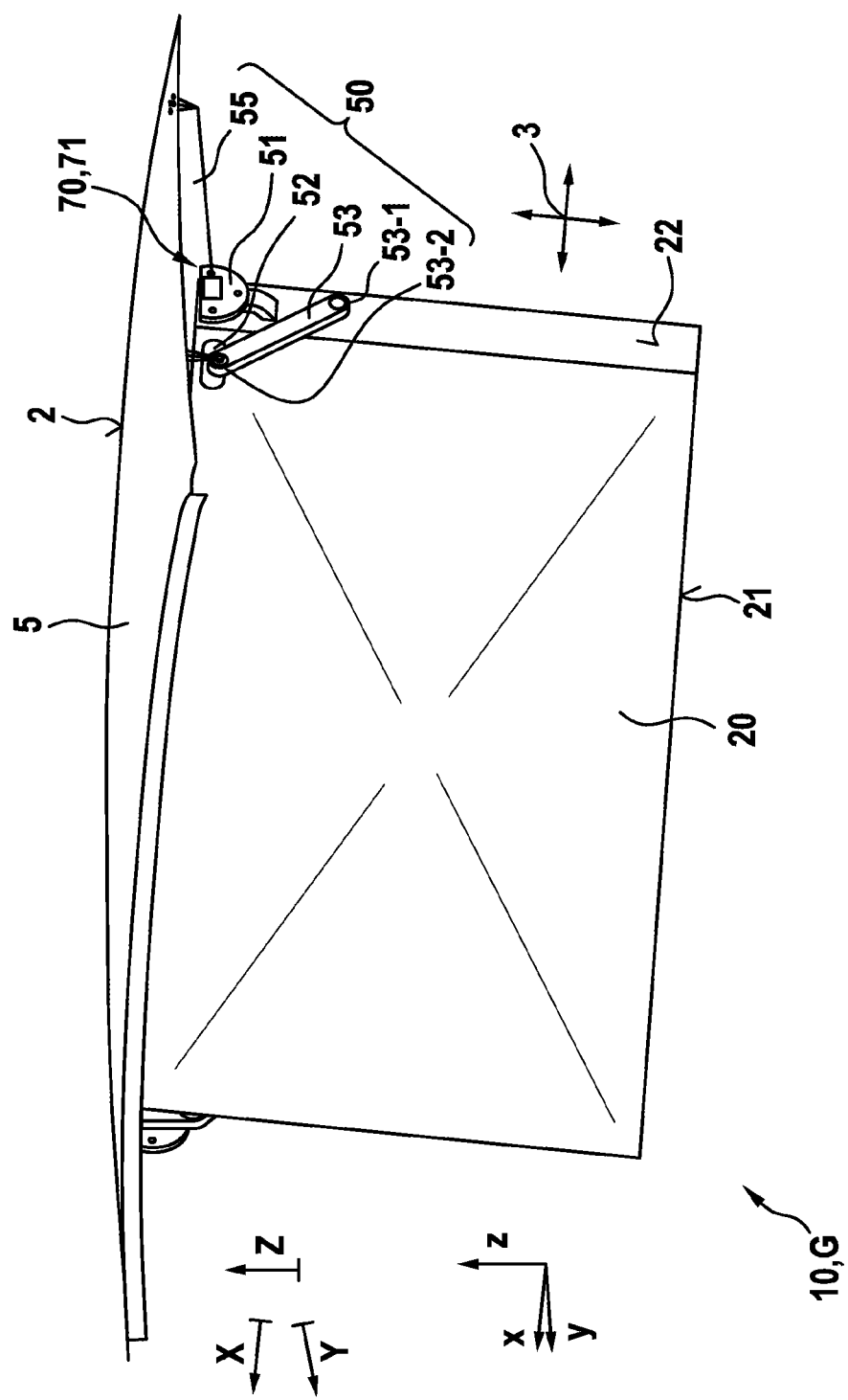
FIG. 12 shows a schematic, perspective side view of an other embodiment of the display unit according to the invention, with a slip clutch in a position of use.

Accordingly, FIG. 12 shows a schematic, perspective side view of an other embodiment of the display unit 10 according to the invention, with a slip clutch 71 as a safety device 70, in a position of use G.

In this case, the slip clutch 71 is realized as a component between the first guide elements 51, which define the pivot 61, and the guide rails 55.

Figure 13:
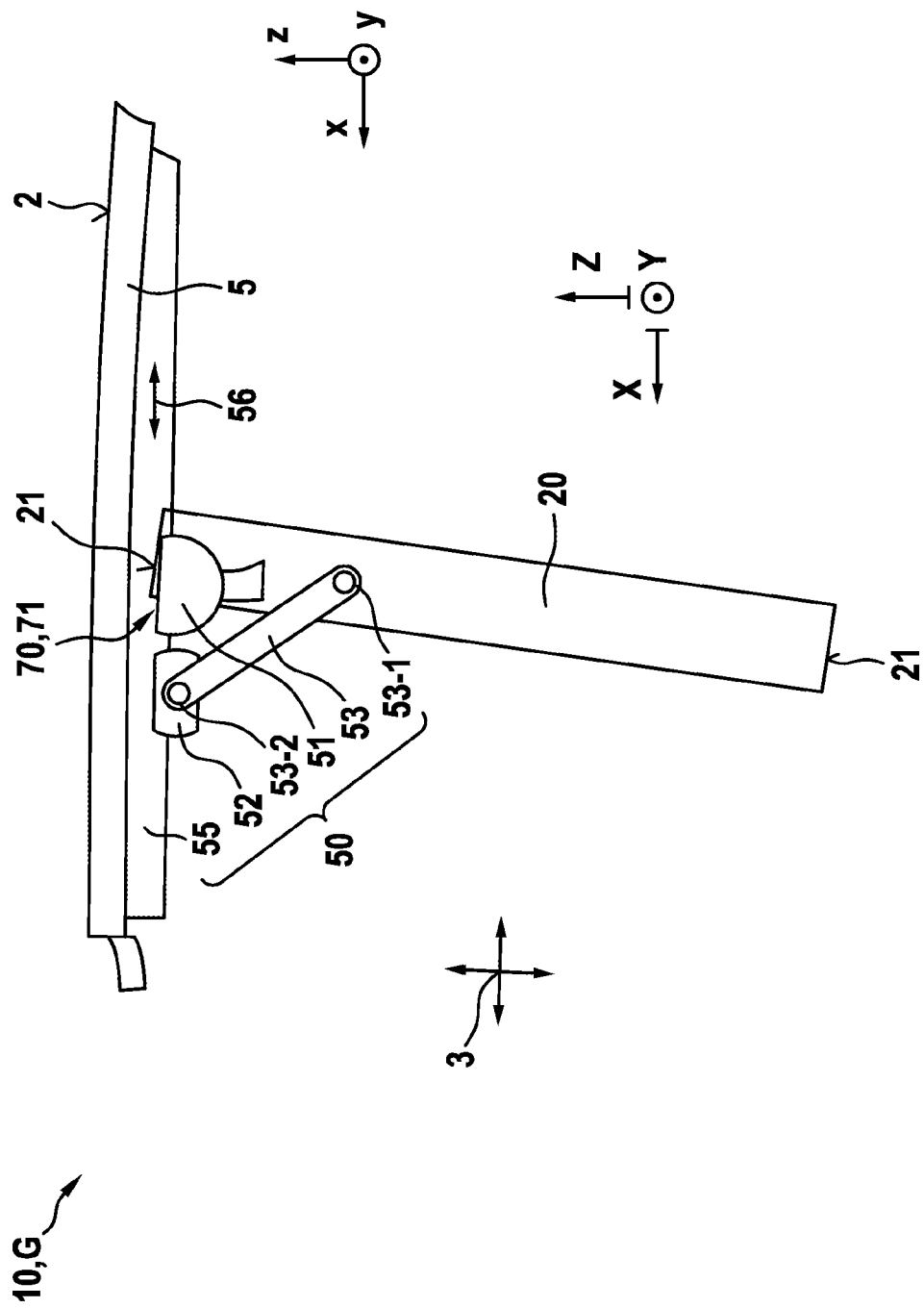
FIGS. 13 to 15 show schematic side views of the embodiment of the display unit according to the invention represented in FIG. 12 in differing positions in the interior of a vehicle according to the invention that are assumed upon the occurrence of decelerations that exceed a predefined minimum magnitude.
Figure 14:
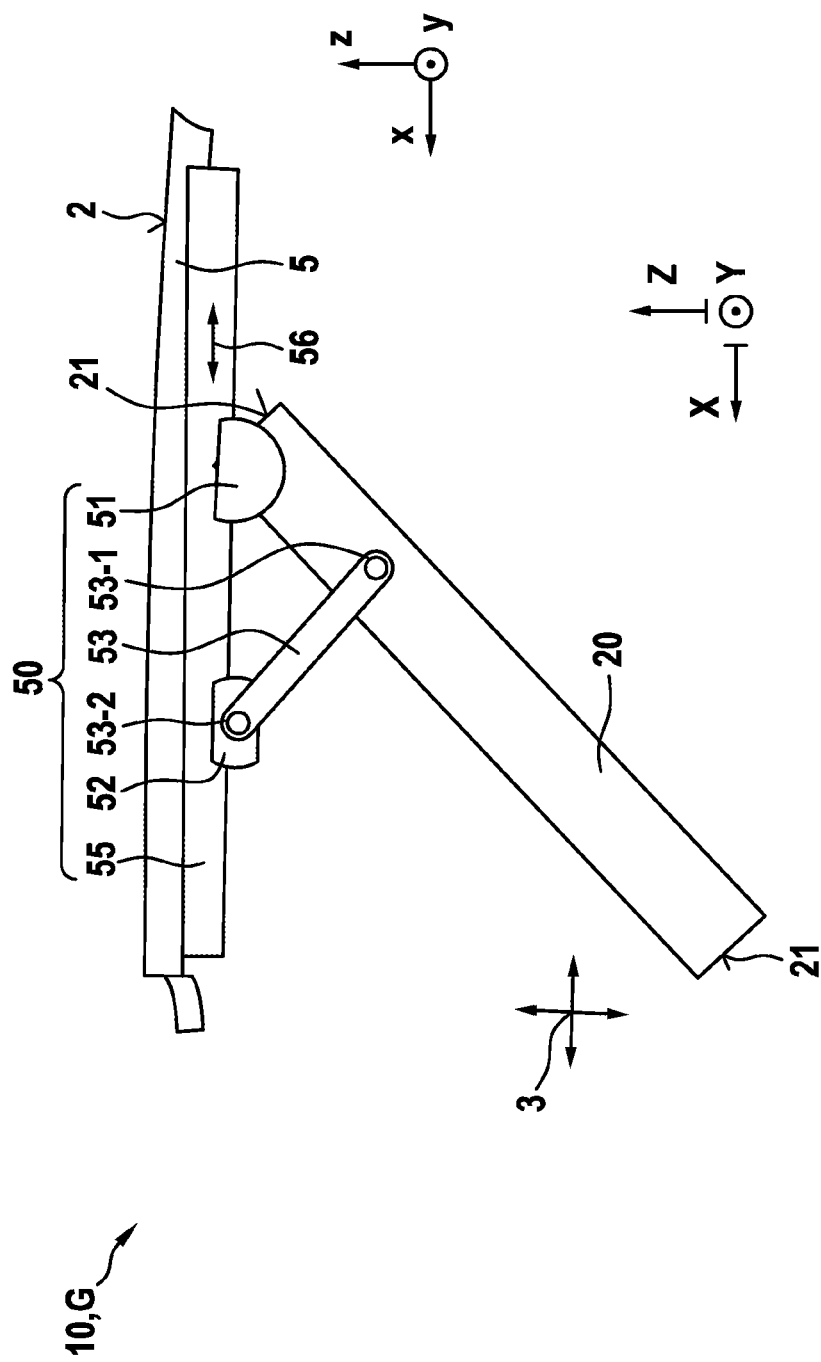
Figure 15:
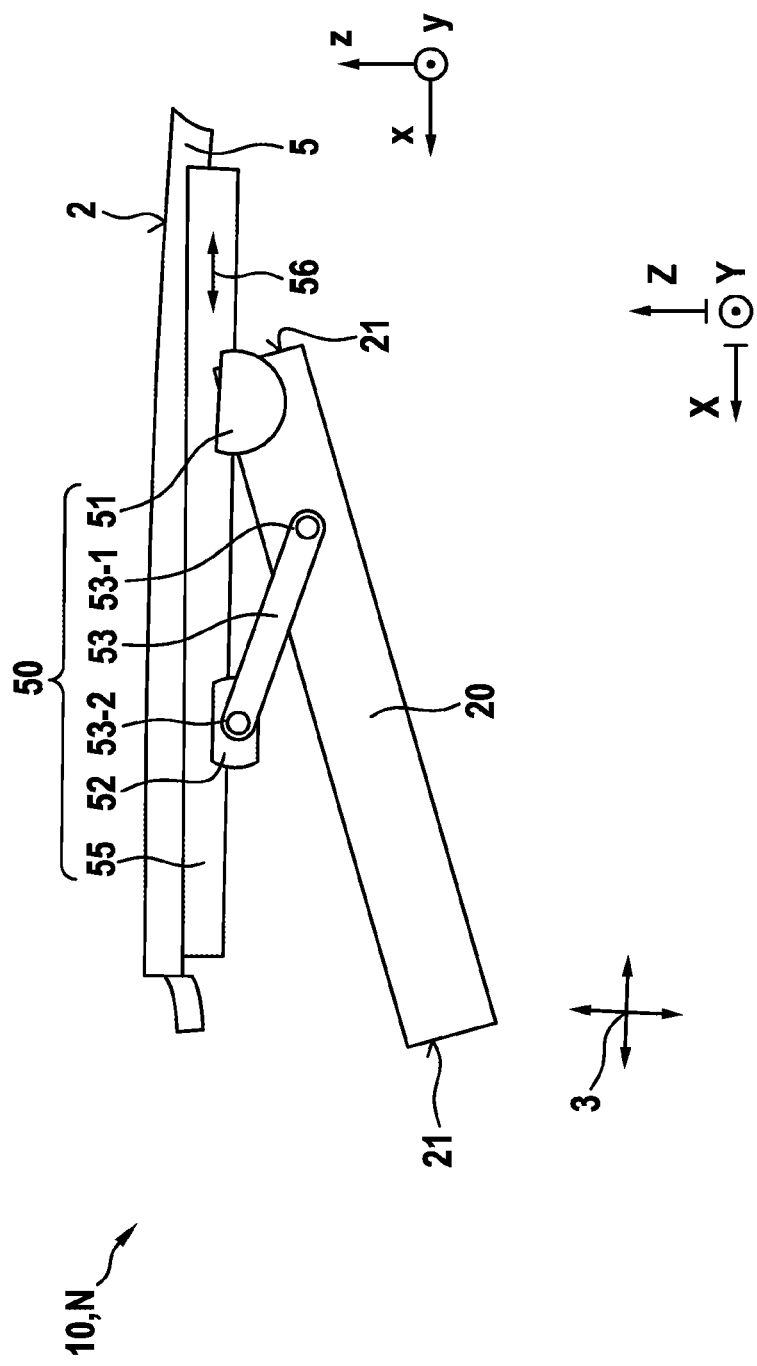

FIGS. 13 to 15 show schematic side views of the embodiment of the display unit 10 represented in FIG. 12 in differing positions N and G in the interior 3 of a vehicle 1 that are assumed in the event of an accident.

Owing to the fact that the first guide elements 51 are designed with a slip clutch 71 as part of a safety unit 70, when a deceleration exceeding a minimum magnitude occurs force is transmitted to the first guide elements 51 via coupling to the coupling lever 53 and locked second guide elements 52, such that, upon the exceeding of a limit force, which may be related to a limit deceleration or limit acceleration, for example having a value of 5 g or more, the first guide elements 51 start to move, and move in the guide rails 55 in the direction of the rear of the vehicle 1, such that the display unit 20, as shown in FIGS. 13 to 15, folds forward out, deflecting into the position of non-use N, such that the interior 3 of the vehicle 1 is easily and quickly cleared.

Figure 16:
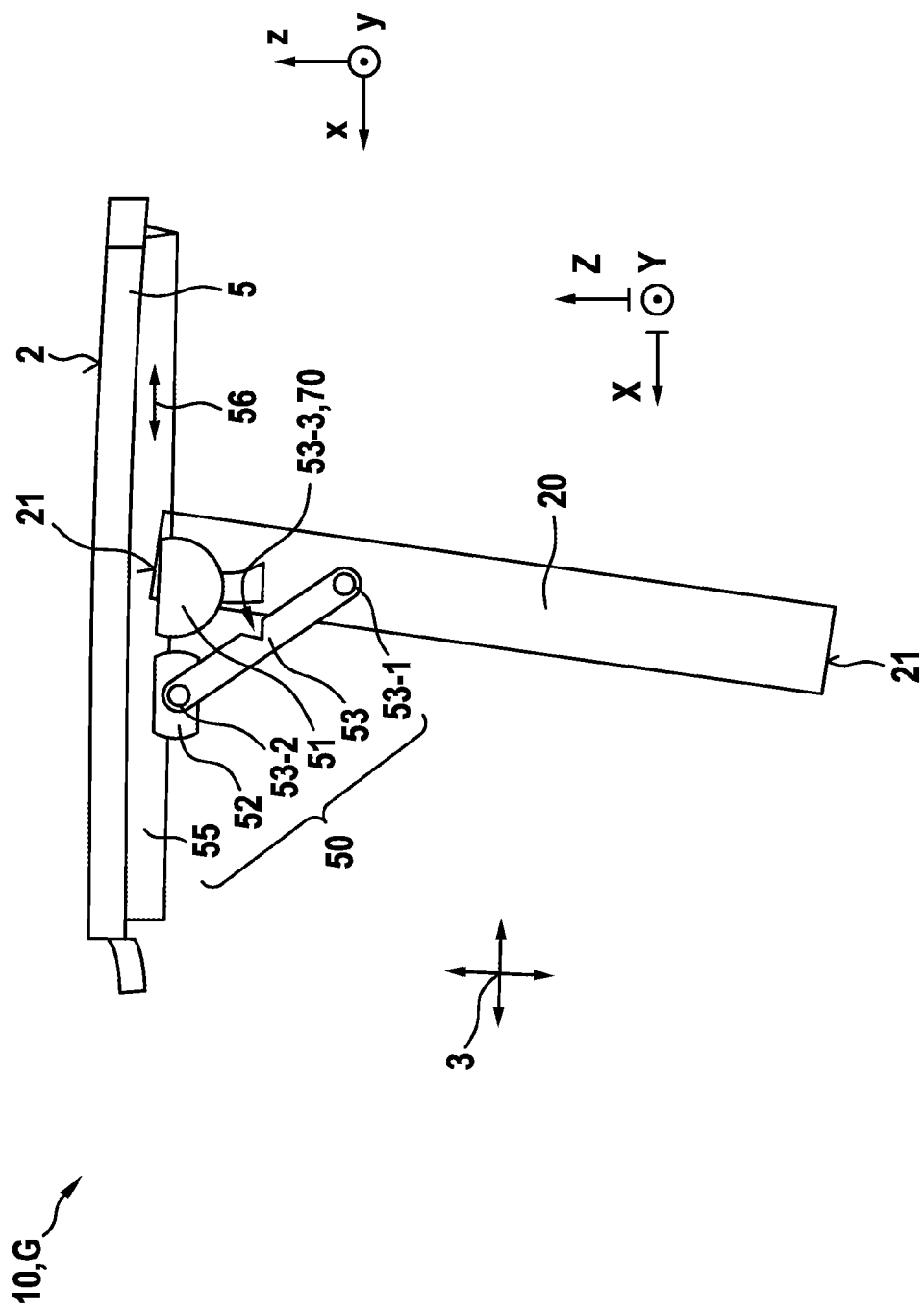
FIGS. 16 to 18 show schematic side views of another embodiment of the display unit according to the invention, in which the coupling lever has a predetermined buckling point, specifically in differing positions in the interior of a vehicle according to the invention that are assumed upon the occurrence of decelerations that exceed a predefined minimum magnitude.
Figure 17:
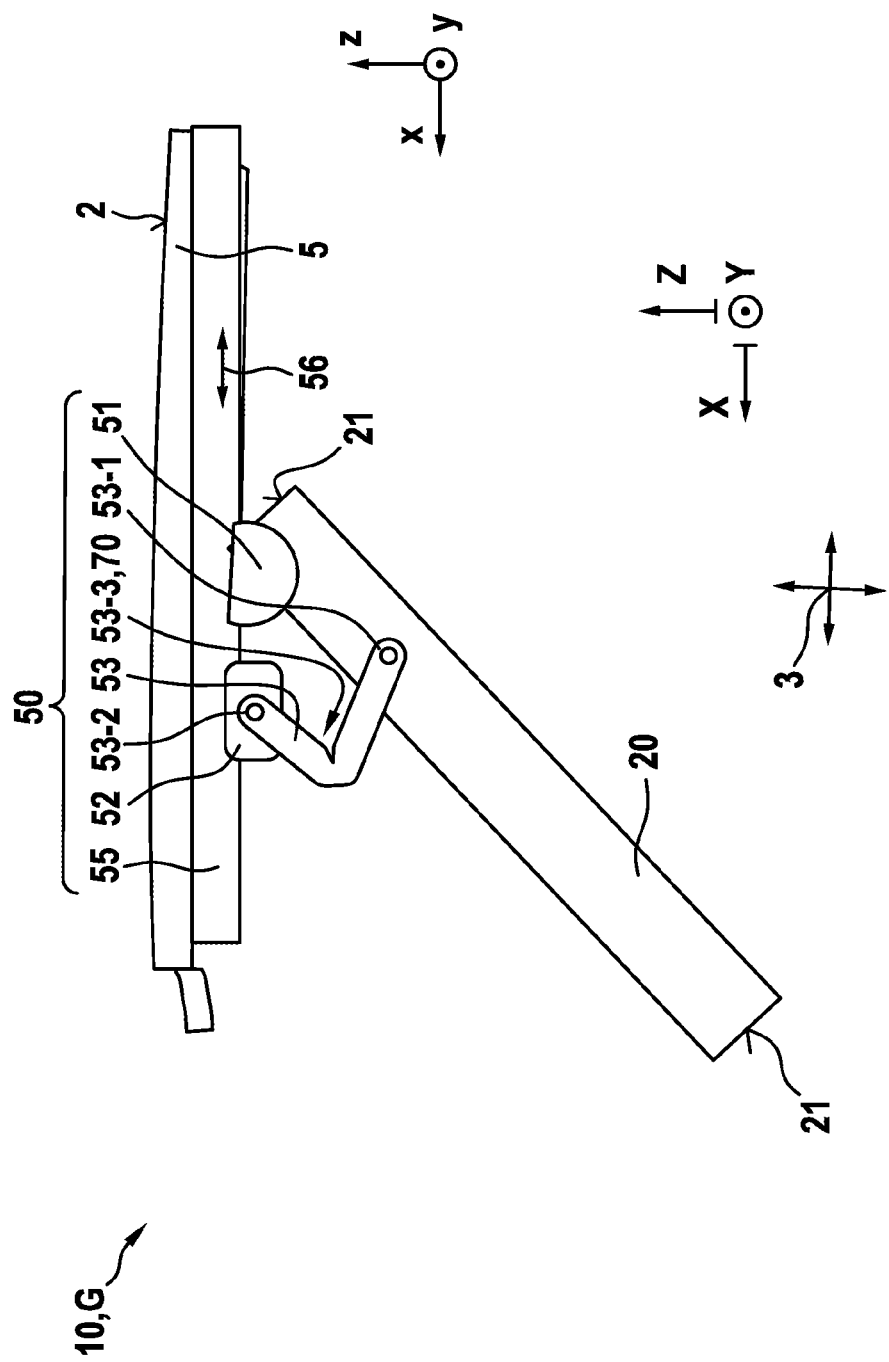
Figure 18:
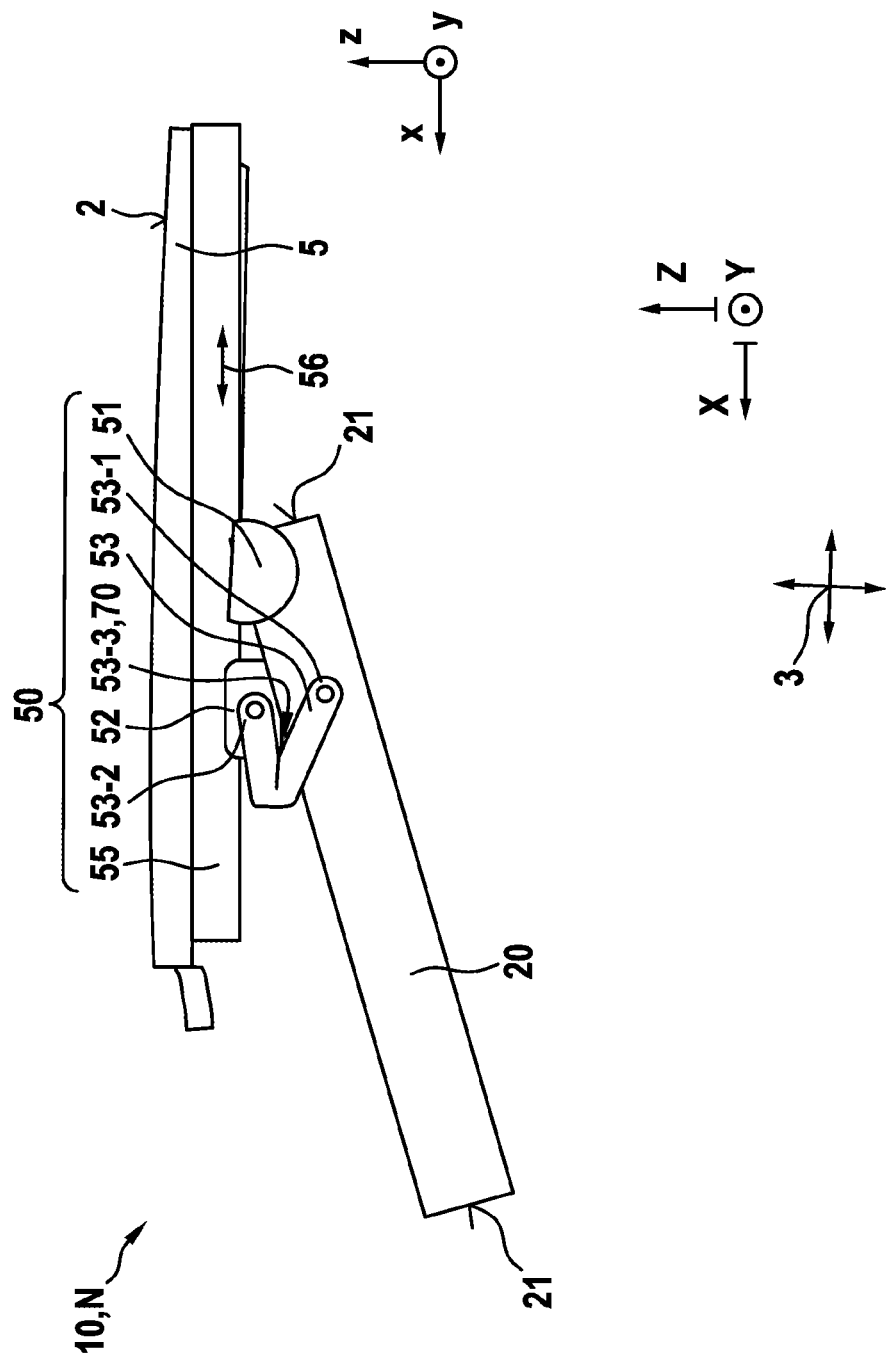

FIGS. 16 to 18 show schematic side views of another embodiment of the display unit according to the invention that has a predetermined buckling point 53-3 on or in the coupling lever 53, as a safety unit 70, specifically in differing positions in the interior 3 of a vehicle 1 according to the invention that are assumed in the event of an accident.

The specified buckling point 53-3 thus functions as a dedicated mechanical weak-point that yields when a break-away force is exceeded, such that the coupling lever changes from its original linear shape, buckles inward and thus, with the first guide elements 51 locked or braked, and in particular also with movement of the second guide elements 52 out of the rear of vehicle 1, allows the display unit 20 to fold forward, such that the display unit 20 swivels forward in the direction of the roof liner 5 and thus into the position of non-use N, such that the interior 3 of the vehicle 1 is immediately cleared.

These and other features and characteristics of the present invention are explained further by the following expositions:

Folding monitors in the roof region are already known from public transport and various other vehicles. These fold the monitor into a position swiveled away from the roof, for example into a vertical position, by means of a single-joint hinge at the front edge of the monitor. A longitudinal adjustability is not provided.

The folding movement in this case guides the monitor closely past the heads of the viewers. Owing to a lack of adjustment capability in the longitudinal position, the monitor cannot be adjusted in respect of use, e.g. for touch operation as compared to a cinema position with maximum distance between the monitor and the viewer's eye.

According to the invention, mounted in the vehicle 1, on the left and right side in the region of the roof liner 5, there is a rail system that comprises guide rails 55, the guide rails 55 extending substantially in a direction of longitudinal extent X of the vehicle 1. In the case of the embodiments of the present invention shown in the figures, on each side there are two sliders, as first and second guide elements 51 and 52, respectively, that can be driven by corresponding electric motors, as drives 81, 82.

The slider that is the rear slider in the vehicle, i.e. in particular the first slider 51, receives the pivot 61 of the monitor, as a display unit 20, and/or defines the pivot 61.

The respectively front slider, as a second guide element 52 within the meaning of the present invention, receives or forms a rotatable coupling to a coupling lever 53. Displacement or movement of the rear or first slider 51 when the front or second slider 52 is stationary results, because of the relative movement of the sliders 51 and 52—in this case with the second slider 52 being stationary—in an unfolding or in an adjustment of the inclination.

The coupling lever 53 lowers the monitor display unit 20 on the side facing away from the occupant's head, such that a maximum clearance is maintained between the occupant's head and the monitor as a display unit 20.

If the front and rear sliders 51 and 52 move synchronously, i.e. with an identical range of motion and without relative movement between the sliders as first and second guide elements 51 and 52 within the meaning of the present invention, a merely longitudinal adjustment is effected, i.e. in particular parallel to the direction of longitudinal extent X of vehicle 1, without changing the inclination of the monitor as a display unit 20.

The kinematics according to the invention, formed in the described manner by the combined action of the first and second guide elements or sliders 51, 52, the guide rails 55, including the guideway 56, and the coupling lever 53, allows folding in and out, i.e. assumption of a position of use or a position of non-use, an adjustment of the inclination and/or a capability for adjustment of the position of the display unit 20 in the direction of longitudinal extent X of the vehicle 1.

The monitor as a display unit 20 is lowered or swiveled away with a maximum possible clearance or free space between the head of an occupant and the monitor as display unit a 20. This reduces the risk of injury.

Conventionally, a monitor as a display unit can only be positioned in the clear region of a trajectory analysis. Conventionally, therefore, only monitors that occupy a comparatively limited space, i.e. small monitors, are possible, and moreover they may also have to be mounted in an ergonomically rather unfavorable manner.

In the folding kinematics proposed according to the invention for the monitor as a display unit 20, for example a specified failure point, for instance in the sense of a specified buckling point, can be provided with a predefinable or adjustable force level.

Furthermore, the geometric position of the centre of gravity of the monitor as a display unit 20, a kinematic system and a specified failure point can be applied in such a manner that the display unit 10 removes the monitor from the interior 3 of vehicle 1, due to its inertia, upon the occurrence of a deceleration that exceeds a predefined minimum magnitude occurs.

LIST OF REFERENCES

1 vehicle
2 vehicle body
3 interior
5 roof liner
6 occupant, rear
10 display device
20 display unit
21 transverse edge
22 longitudinal edge
30 carrier
40 display element, monitor, screen
50 movement mechanism
51 (first) guide element, (first) slider
52 (second) guide element, (second) slider
53 coupling lever
53-1 (first) end of the coupling lever 53 (on the display unit 20)
53-2 (second) end of the coupling lever 53 (on a second guide element 52)
55-3 buckling point
55 guide rail
56 guideway
60 swivel unit
61 pivot
70 safety unit
71 slip clutch
80 drive unit
81 (first) drive/motor for first guide element 51
82 (second) drive/motor for second guide element 52
83 (first) drive means/brush cable/helical cable for first guide element 51
84 (second) drive means/brush cable/helical cable for second guide element 52
G position of use
position of non-use
x spatial direction
X direction of longitudinal extent of the vehicle 1
Y spatial direction
Y direction of transverse extent of the vehicle 1
z spatial direction
Z direction of height extent of the vehicle 1

What is claimed is:

1. A display device for an interior of a vehicle, comprising:
   a display unit that visually displays information; and
   a movement mechanism that transfers the display unit between a position of non-use parallel to a roof liner of the vehicle and a position of use swiveled away from the roof liner of the vehicle, and holds the display unit in the position of non-use and/or in the position of use, wherein the movement mechanism comprises:

first guide elements directly and rotatably attached to the display unit so as to define a pivot axis for swiveling the display unit at least between the position of non-use and the position of use, second guide elements, each of which is indirectly coupled to the display unit via respective coupling levers of the display device, wherein indirect coupling of the movement mechanism to the display unit is exclusively via the coupling levers, and guide rails attaching that are attachable to the roof liner, the guiderails forming a guideway operable to receive the first and second guide elements such that the first and second guide elements are moveable therein along the guideway.

2. The display device according to claim 1, wherein the coupling levers are:
realized as a pair,
identical or substantially identical to each other,
of equal length,
linear or substantially linear,
aligned parallel to each other,
aligned flush with each other, and/or
each realized with a first end and a second end.

3. The display device according to claim 2, wherein
a respective first end of a coupling lever is attached in a rotatably mounted manner to the display unit, and/or
a respective second end of a coupling lever is attached in a rotatably mounted manner to an associated second guide element.

4. The display device according to claim 3, wherein
a position of a mounting point of a first end of a coupling lever on the display unit is in each case:
spatially spaced apart from a position of a mounting point of an associated first guide element, and/or
arranged on or in the region of a longitudinal edge of the display unit.

5. The display device according to claim 1, wherein the first guide elements and/or the second guide elements are:
identical or substantially identical amongst each other or as a whole,
realized as sliders, and/or
configured for sliding movement in a respective guide rail.

6. The display device according to claim 1, wherein
the first guide elements are attached to, or in the region of, a first transverse edge and/or a longitudinal edge of the display unit, and/or
when the display device has been mounted in the vehicle, the first transverse edge together with the pivot is aligned parallel to a direction of transverse extent of the vehicle.

7. The display device according to claim 1, wherein the display unit is configured:
with a substantially rectangular shape,
with transverse edges aligned parallel to a direction of transverse extent of the vehicle when the display device has been mounted on the vehicle, and/or
with longitudinal edges aligned parallel to a direction of longitudinal extent of the associated vehicle when the display device has been mounted on the associated vehicle.

8. The display device according to claim 1, wherein the guide rails are:
realized as a pair,
identical or substantially identically to each other,
linear or substantially linear,
aligned parallel to each other,
aligned flush with each other in respect of their respective first and second ends,
attached to, or in the region of, a roof liner when the display device has been mounted on the vehicle, and/or
aligned parallel to a direction of longitudinal extent of the vehicle when the display device has been mounted on the vehicle.

9. The display device according to claim 1, wherein
a specified buckling point, having a predefined breakaway force as a specified buckling force, is realized on or in a respective coupling lever in such a manner that, upon the specified buckling force being exceeded, the coupling lever buckles inward at the specified buckling point and thereby changes from a non-buckled normal shape into a buckled safety shape,
a slip clutch and/or a brake, having a return stop, are/is realized on or in a first guide element or between a first guide element and an associated guide rail, the slip clutch and/or the brake having a predetermined holding force as a specified holding force, in such a manner that, upon the specified holding force being exceeded, a respective first guide element moves, in response to an acting force, in a respectively associated guide rail,
wherein the specified buckling force and/or the specified holding force corresponds to an acceleration of 5 g.

10. The display device according to claim 1, further comprising:
a drive unit that is:
(i) configured to drive the first guide elements and/or the second guide elements, and is designed to move the first guide elements and the second guide elements separately and/or jointly and equally in a respective guide rail, and/or
(ii) realized with one or more controllable drives, and with drive means that are mechanically couplable to them and that are assigned to respective guide elements, in the form of brush cables or helical cables that are designed for meshing engagement by first and/or second guide elements for the purpose of moving them.

11. A vehicle, comprising:
a vehicle body;
an interior, formed by the vehicle body, and having a roof liner; and
a display device attached on or in the roof liner, the display device comprising:
a display unit that visually displays information; and
a movement mechanism that transfers the display unit, between a position of non-use parallel to a roof liner of the vehicle, and a position of use swiveled away from the roof liner of the vehicle, and holds the display unit in the position of non-use and/or in the position of use, wherein the movement mechanism comprises:
first guide elements directly and rotatably attached to the display unit so as to define a pivot axis for swiveling the display unit at least between the position of non-use and the position of use,
second guide elements, each of which is indirectly coupled to the display unit via respective coupling levers of the display device, wherein indirect coupling of the movement mechanism to the display unit is exclusively via the coupling levers, and
two guide rails attached to the roof liner, the guiderails forming a guideway operable to receive the first and second guide elements such that the first and second guide elements are moveable therein along the guideway.

12. The vehicle according to claim 11, wherein:
the two guide rails of the display device are attached on or in the roof liner so as to extend with equal length flush and parallel to each other in a direction of longitudinal extent of the vehicle, and, with respect to a direction of transverse extent of the vehicle, in outer regions of the roof liner,
two first guide elements of the display device are received in the guide rails such that a corresponding first transverse edge of the display unit of the display device, to a region of which the first guide elements are attached, is arranged parallel to the direction of transverse extent of the vehicle and, with respect to the direction of longitudinal extent of the vehicle, in a direction of a side that faces toward the rear of the vehicle, and
two second guide elements of the display device are received in the guide rails such that a second transverse edge of the display unit of the display device that is opposite the first transverse edge is arranged in a direction of a side that faces away from the rear of the vehicle.

\* \* \* \* \*